United States Patent
Mayer et al.

(10) Patent No.: US 12,467,750 B2
(45) Date of Patent: Nov. 11, 2025

(54) SURVEYING DEVICE FOR IMPROVED TARGET CLASSIFICATION

(71) Applicant: LEICA GEOSYSTEMS AG, Heerbrugg (CH)

(72) Inventors: Martin Mayer, Koblach (AT); Ulrich Hornung, St.Gallen (CH); Barbara Haupt, Walzenhausen (CH); Katrin Mentl, Marbach (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

(21) Appl. No.: 18/523,714

(22) Filed: Nov. 29, 2023

(65) Prior Publication Data
US 2024/0191991 A1 Jun. 13, 2024

(30) Foreign Application Priority Data
Dec. 13, 2022 (EP) .................... 22213123

(51) Int. Cl.
*G01C 15/00* (2006.01)
*G02B 23/16* (2006.01)
(Continued)

(52) U.S. Cl.
CPC ........... *G01C 15/006* (2013.01); *G02B 23/16* (2013.01); *G06T 7/73* (2017.01); *G06V 10/764* (2022.01);
(Continued)

(58) Field of Classification Search
CPC .............. G01C 15/006; G06T 7/73; G06T 2207/10152; G06T 2207/20081; G06T 2207/20224; G06V 10/764; G02B 23/16
See application file for complete search history.

(56) References Cited

U.S. PATENT DOCUMENTS

| 2014/0211999 A1* | 7/2014 | Kwiatkowski | G01C 1/04 382/103 |
| 2015/0022885 A1* | 1/2015 | Hutter | G01C 15/002 359/426 |

(Continued)

FOREIGN PATENT DOCUMENTS

EP    1329691 A2    7/2003

OTHER PUBLICATIONS

Maar Hannes et al: "Leica Nova MS60 White paper", Aug. 1, 2017 (Aug. 1, 2017), XP055874203, [retrieved on Dec. 17, 2021].
(Continued)

*Primary Examiner* — Sunghyoun Park
(74) *Attorney, Agent, or Firm* — Maschoff Brennan

(57) ABSTRACT

A geodetic surveying device, wherein the geodetic surveying device is configured for surveying retroreflective cooperative targets, the geodetic surveying device comprising a base, a telescope and a support. The geodetic surveying device further comprises a target recognition emitting unit, called ATR-illuminator, an target recognition sensor, called ATR-sensor, an angle encoder and a processing unit. The geodetic surveying device is configured to distinguish desired targets from undesired targets, wherein the geodetic surveying device further comprises a classification model, wherein the classification model is configured for classification of retroreflective targets generating spots, wherein the retroreflective targets are classified into desired targets and undesired targets, wherein the classification is carried out by applying the classification model on the spot.

9 Claims, 3 Drawing Sheets

(51) Int. Cl.
*G06T 7/73* (2017.01)
*G06V 10/764* (2022.01)

(52) U.S. Cl.
CPC .............. *G06T 2207/10152* (2013.01); *G06T 2207/20081* (2013.01); *G06T 2207/20224* (2013.01)

(56) References Cited

U.S. PATENT DOCUMENTS

2020/0217662 A1    7/2020  Gächter Toya et al.
2020/0355499 A1*  11/2020  Hinderling .............. G01C 1/04

OTHER PUBLICATIONS

Grimm David et al: "ATRplus White paper", Oct. 1, 2015 (Oct. 1, 2015), pp. 1-12, XP093050184, [retrieved on May 26, 2023].
European Search Report dated Jun. 12, 2023 in application No. 22213123.7.

\* cited by examiner

SURVEYING DEVICE FOR IMPROVED TARGET CLASSIFICATION

FIELD

The present disclosure relates to a geodetic surveying device, wherein the geodetic surveying device is configured for surveying retroreflective cooperative targets, the geodetic surveying device comprising a base, a telescope and a support. The geodetic surveying device further comprises a target recognition emitting unit, called ATR-illuminator, an target recognition sensor, called ATR-sensor, an angle encoder and a processing unit.

The present disclosure further relates to a geodetic surveying device, wherein the geodetic surveying device is configured for surveying retroreflective cooperative targets, the geodetic surveying device comprising a base, a telescope and a support. The geodetic surveying device further comprises an emitting unit, called PowerSearch-illuminator, a receiving unit, called PowerSearch-sensor, an angle encoder and a processing unit.

BACKGROUND

Prior art ATR (Automated Target Recognition) systems comprise means for emitting an illumination beam and for detecting at least part of the portion of the illumination beam reflected back from a target. Usually, the illumination is carried out by continuous emission of short illumination beam pulses or illumination beam flashes. The illumination beam is, for example, a divergent laser beam and correspondingly continuous laser pulses are emitted as illumination beam flashes. In this case, the reflected laser light is imaged as a reflection spot (light spot) on an image sensor, e.g. a CMOS- or CCD image sensor (CMOS-2DChip) or non-image sensors like PSD and quadrant detectors.

EP 1 329 691 A2 discloses an optoelectronic target search device consisting of a fan-like transmitting channel (also called PowerSearch unit), which irradiates the target of interest, a fan-like receiving channel, which receives the light reflected from the target, a motorized measuring device, for example a theodolite, which moves about one of the two axes during the search operation, at least one electronic processing unit for determining the coarse target position, signal strength of the reflected signal, the extent of the target in the scanning direction, and the distance to the target. Optionally, the duration of the reflected optical signal can also be recorded. Reflectors are detected based on return signal strength and classified based on a distance-dependent return signal strength threshold.

A substantial disadvantage of all devices known so far is the insufficient robustness against strongly reflecting foreign objects (e.g. windows or warning vests, etc.), which are accidentally interpreted/classified as target object, as well as disturbance or at least delay of the search process by strong sunlight or sun reflexes. Further, unfavorable environmental conditions such as rain, fog, darkness or dirt on the targets make the correct classification of the targets difficult, since, for example, the return signals (for PowerSearch unit)/spots (for ATR unit) lose intensity and fall below the threshold value or are lost in noise. For example, when prisms are wet or occluded by dirt or dust, the return signal or spot size/intensity is reduced, but the spot size may increase (blurry spot), and they may be missed (below threshold) respectively mis-classified.

SUMMARY

It is therefore an object to provide a geodetic surveying device, in particular total station or theodolite, configured for surveying retroreflective cooperative targets, in particular of the type surveying prisms or reflective tapes, having an improved target classification.

Another object is to provide a geodetic surveying device, in particular total station or theodolite, configured for surveying retroreflective cooperative targets, in particular of the type surveying prisms or reflective tapes, having an improved target classification.

Another object is to provide a computer program product for carrying out a method with a geodetic surveying device, for improved target classification.

The present disclosure relates to a geodetic surveying device, in particular total station, laser tracker, laser scanner or theodolite, wherein the geodetic surveying device is configured for surveying retroreflective cooperative targets, in particular of the type surveying prisms or reflective tapes, the geodetic surveying device comprising a base, a telescope, wherein the telescope is configured for carrying out a distance measurement by means of a laser beam emitted via a beam exit of the telescope, and a support, wherein the support is attached to the base so as to be rotatable about a vertical axis of rotation and the telescope is attached to two opposing leg components of the support so as to be rotatable about a horizontal axis of rotation. The geodetic surveying device further comprises a target recognition emitting unit, called ATR-illuminator (part of the automated aiming unit, typically CMOS, global shutter, IR sensitive, monochrome), configured to emit a radiation beam, in particular in a beam divergence of 0.5° to 5°, an target recognition sensor, called ATR-sensor, defining a field-of-view corresponding to the beam divergence, and having a position-sensitive area for receiving radiation of the radiation beam reflected at retroreflective targets for generating ATR (Automated Target Recognition) image data (e.g. the ATR image data is optionally the result of merging and pre-processing, not just reading out an image sensor), wherein spots corresponding to the received radiation are derivable from the ATR image data, an angle encoder, wherein the angle encoder is configured to determine orientations of the telescope and/or the support and/or the ATR-illuminator relative to the base, and a processing unit configured to determine angular data depending on spot positions in the image data.

The geodetic surveying device is configured to distinguish desired targets from undesired targets, wherein the geodetic surveying device further comprises a classification model, wherein the classification model is configured for classification of retroreflective targets generating spots, wherein the retroreflective targets are classified into desired targets and undesired targets, wherein the classification is carried out by applying the classification model on the spot, in particular spot characteristics.

In other words, when a TPS is searching or aiming, the goal is to exclude foreign reflectors (e.g. windows, vests, etc.) and find desired reflectors, i.e., geodetic reflectors such as prisms, reflective tapes (typically adhesive, i.e., can be glued to objects) or cateye reflectors (cateyes such as found on bikes feature a coarser mini-prismatic structure that implies a more narrow return lobe and stronger return signal compared to reflective tapes). The automated target aiming unit (ATR) is detecting reflectors. Then, the digitized return signal (spot) is analyzed (e.g. machine learning detectors comprise these two steps in one model, so that it does not have to be a 2-step process) to detect at least one reflector and its direction and perform classification of at least one detected reflector by extracting return signal (spot) characteristics of the at least one reflector and applying a suitable classifier (classification model) on the return signal characteristics. It is also possible to do the two steps of detecting reflectors and analyzing the return signal by using only a single Machine Learning object detection model, like mobilenet+SSD, YOLO or CenterNet.

This disclosure has the advantage over prior art systems that desired targets such as prisms or reflective tapes can be distinguished from undesired targets without having to interrupt the searching and aiming of targets by means of the distance measuring unit (i.e. the classification happens "on the fly"). Furthermore, the classification of the targets runs automatically and the user is not forced to select the targets manually or to start the classification on the device. The user can therefore concentrate fully on other tasks or on moving around, which brings an additional increase in safety. In this way, a easier, more time-efficient and safer classification and subsequent measurement of geodetic targets is possible. In addition, the disclosure offers the advantage that if additional spots are detected in the ATR image data recorded at one position of the ATR unit, triggered by interfering radiation from, for example, vehicle headlights, sunlight reflected from window, etc., the spots belonging to the desired targets can be identified by the classification (model) and these targets can be reliably and quickly identified and thus measured despite the interfering radiation.

In a further embodiment, the classification model comprises a catalogue of spot data, wherein the catalogue of spot data comprises at least one of:
  size of the spots,
  shape of the spots,
  position of the spots in the ATR image data,
  intensity of the spots,
  sharpness of the transition from the spots to non-irradiated (background) ATR image data,
  abstract representations of the spots learned by machine learning techniques such as neural networks (the spot data that is learned by machine learning may feature such abstract representations of the spot that are not obvious to the human observer),
  distance information, and
  physical size of the retroreflective target,
in particular wherein the geodetic surveying device is configured to determine a distance to the retroreflective target based on the size of the spot and a known type of the target.

In other words, the automated target aiming unit (ATR) records a return signal in form of a spot on an image sensor. The spot data recorded during aiming motion (e.g. spiral search) indicates reflectors and possibly reflector conditions, such as wet prisms.

This embodiment has the advantage that the catalogue of spot data comprises a variety of spot data and thus different spot data can be used for the classification, wherein the number of spot data used can be varied depending on the quality or probability of a correct classification. If, for example, it is not sufficient to match the spot size according to spot data comprised in the catalogue of spot data with the spot from the ATR image data, further spot data from the catalogue of spot data, such as intensity of the spot, can be used for the matching.

In a further embodiment, based on the spot data comprised in the catalogue of spot data size of the retroreflective targets is determined.

This embodiment has the advantage that, based on the determined size of the targets, different products can be distinguished within a target type (for example, the target tape of a product line exists in different sizes).

In a further embodiment, the size and/or the reflectivity of the retroreflective targets (horizontal and/or vertical dimension) is determined based on the measured distance to the retroreflective targets, wherein the measured distance is obtained by at least one of:
  distance meter (EDM) measurement (time-of-flight, waveform digitizer WFD, time to digital converter TDC, etc.),
  time-of-flight measurement (pulse or phase), e.g. with ToF camera,
  image sensor which analyzes spot size and relating the spot size to distance (assuming that the spot belongs to a reflector with known size).

The EDM features very short pulses (width<1 ns) and high time resolution by waveform digitizer sub-sample interpolation techniques. By analyzing the pulses in the digital signal vector, multiple pulse returns (window in front of reflector) and pulse widening (e.g. by triple glazing of window) can be detected.

In a further embodiment, based on spot data of the catalogue of spot data, different types of retroreflective cooperative targets, in particular surveying prisms and reflective tapes, are determined by matching the spots with the spot data of the catalogue of spot data.

This embodiment has the advantage that several types of targets can be set up at the same time on a construction site and, based on the classification, the targets of the desired type can be correctly and quickly targeted and measured. In this way, for example, a fast, simple and correct measurement of prism targets on a construction site is possible, even though reflective tapes from a previous measurement process are still attached to certain points on the construction site.

In a further embodiment, the spot data of the catalogue of spot data are determined from the ATR image data by means of a machine learning model, and/or the classification is carried out by the machine learning model.

In a further embodiment, if the determination of the type of retroreflective cooperative target indicates that the retroreflective cooperative target is a survey prism, the prism constant is determined.

This embodiment has the advantage that, based on the determined prism constant, different products can be distinguished within a target type (for example, different prism types are used to manufacture targets).

In a further embodiment, the spot characteristics (or the spot data of the catalogue of spot data) are determined from the spot (derived from the ATR image data) by extraction, wherein the extraction is at least one of
  region of interest cropping,
  resampling,
  interpolation,
  rescaling,
  subspace method,
  discrete Fourier transform,
  discrete wavelet transform,
  feature extraction (e.g. neural network, principal component analysis, autoencoder).

The spot characteristics indicate among other things:
  geometric shape of reflective area,
  geometrical arrangement of at least one reflective element (e.g. targets often comprises several prismatic reflectors),
  size of reflective area (utilizing distance information),
  reflectivity (utilizing distance information).

In a further embodiment, the geodetic surveying device is configured to
  generate a series of ATR image data, optionally with continuously changing orientation of the ATR-illuminator, in particular changing orientation of the ATR-illuminator at every image or at least at every second image of the series of ATR image data, generate image data of the series of ATR image data with different ATR illumination, in particular with alternating ATR illumination on and off, and generate difference image data, wherein optionally the difference image data is motion-compensated and accumulated, (difference image subtracts the background radiation e.g. by sunlight and only the return signal of the illuminated reflector is remaining) using the image data of the series of ATR image data generated with different ATR illumination.

This embodiment has the advantage that a difference image or accumulated difference image improves the detection signal-to-background ratio.

In a further embodiment, the classification is carried out by applying the classification model on spots comprised in the difference image data.

This embodiment has the advantage that even with a very large number of interfering signals, which may overlap with target signals, the target classification can be performed quickly and reliably, since the interfering signals in the difference image data are removed.

In other words, to increase signal-to-background ratio difference images may be computed and averaging over several measurements (longer exposure time may be performed). The detected spots will be extracted (region of interest cropping) and processed by the surveying device.

In a further embodiment, the radiation beam of the ATR-illuminator is coaxial to the (distance measurement) laser beam emitted via the beam exit of the telescope.

This embodiment has the advantage that when the telescope is searching/aiming for a target, the ATR unit is also aligned with the target to generate ATR image data for the classification of the target and vice versa. In this way, errors due to deviations in the alignment of the two units are prevented.

In a further embodiment, the ATR-illuminator is comprised by the telescope.

This embodiment has the advantage that the telescope and also the geodetic survey device can be built compactly.

In a further embodiment, the radiation beam of the ATR-illuminator is in a non-visible wavelength range, in particular in a wavelength range greater than 780 nm, more in particular in the IR wavelength range.

This embodiment has the advantage that the radiation emitted by the ATR illuminator and reflected by targets does not affect the human eye or other optical sensors that detect light in the visible wavelength range.

In a further embodiment, the rotation of the support around the vertical axis of rotation and/or the rotation of the telescope around the horizontal axis of rotation is carried out by means of a motor.

This embodiment has the advantage that the alignment of the telescope and/or the ATR unit to a target does not have to be carried out manually by the user (potential source of error), but is carried out automatically and accurately by the motor.

In a further embodiment, the motor rotates the support and/or the telescope such that distance measurements are carried out with desired targets by the (distance measurement) laser beam emitted via the beam exit of the telescope.

This embodiment has the advantage that as soon as a desired target has been classified, the user does not have to manually align the telescope with the target (potential source of error), but instead this is automatically and accurately performed by the motor.

In a further embodiment, the telescope is moved by the rotation around the horizontal axis of rotation and the rotation of the support around the vertical axis of rotation in such a way that the laser beam performs a spiral movement.

In a further embodiment, the classification is carried out by at least one of or a combination of the following machine learning methods:
clustering,
feature extraction,
neural network,
random forest.

Spot detections in the image are transformed (e.g. region-of-interest cropping, resizing) and analyzed to perform reflector classification, e.g. by means of a neural network. In other words, data may be labelled to, among other things, train a neural network in a machine learning context, wherein various neural networks may be employed for classification task. Further, data may be transformed into different representations (e.g. magnitude spectrum after DFT). Consequently, prisms can be distinguished from foreign reflectors such as vests with high probability.

For example, the soft output (likelihood, confidence, probability) of the machine learning model/neural network output will be fed into a decision heuristic that will likely decide based on configurable thresholds, where the machine learning model can be a Convolutional Neural Network, like an InceptionNet or a MobileNet or a transformer-based neural network.

Once a target is "locked" (TPS following target with ATR), the classification may run for each measurement (i.e., each camera image, framerate ~200 Hz). An extension considers the time-series of the spot. If there is an anomaly or unnaturally large change between measurements, the target may have been lost or a wrong target may have been locked to. The change detection may be done by Kalman Filter or by comparing handcrafted features (spotsize, spot brightness, . . . ) and threshold or by a neural network (e.g. Siamese network).

In a further embodiment, the machine learning model is configured to be trained with data, in particular ATR image data, generated by the geodetic surveying device and/or with data, in particular ATR image data, provided by an external database, in particular the internet and/or a server and/or a cloud (user-input or user-data (in the cloud) can be used for (re-) training; examples of an external database are a server/cloud where user data from the field is stored and a server/cloud where artificially generated data (simulation data) is stored).

This embodiment has the advantage that the machine learning model can be trained with data from various data sources, wherein the internet in particular is a very easily accessible and inexpensive data source. For example, the training is done in the cloud as the computational performance is better/scalable and then the device downloads the newly trained classifier over the (mobile) internet connection.

In a further embodiment, the classification provides soft information such as
likelihood ratios,
confidence scores,
probabilities,
softmax output,
multinomial logistic regression.

In a further embodiment, the geodetic surveying device is configured to provide a likelihood that a retroreflective target is a desired target, in particular wherein the retroreflective target is classified as a desired target when said likelihood reaches the highest likelihood among all possible target classes.

This embodiment has the advantage that a target is classified as desired even if the likelihood has not yet reached a value of 100%.

In a further embodiment, the geodetic surveying device further comprises a RGB camera, wherein RGB images captured by the RGB camera are further used for the classification of the retroreflective targets into desired targets and undesired targets (e.g. by associating the detected reflector patterns with pixels in a camera image that may contain information about the reflector or by utilizing the scene information (target context, e.g., a surveyor carrying a pole equipped with reflector)).

This embodiment has the advantage that the accuracy of the target classification is increased by using a further detection unit while the processing time is reduced.

In a further embodiment, the geodetic surveying device further comprises a time-of-flight (ToF) camera (the return signal is (demodulated) amplitude information ("gray image")), and/or a distance meter receiver (APD, SiPM) that captures a digital signal vector (single-beam distance meter, laser-scanner receiver).

The classification results of several sensors may be combined in a work-flow to increase the likelihood of correct target detection. In addition to the mentioned sensors, the EDM signal characteristics may also be utilized to improve classification performance.

A typical sequence of a sensor combination may look as follows:
- automated aiming unit (ATR) aims at reflector and performs classification based on return signal spot and outputs a target likelihood (value indicating how likely the reflector is a geodetic target or a specific target class),
- on-axis camera (OAC) takes an image and performs classification based on RGB image and outputs a target likelihood,
- electronic distance measurement unit (EDM) performs distance measurement and return signal is evaluated to obtain a further likelihood,
- by combining at least two likelihood values, and optionally including weighting factors that correspond to the known sensor performance, an improved target likelihood can be derived, wherein the combination of likelihoods is performed by
- machine learning tools like neural network, and/or
- Bayesian estimation framework (e.g. maximum a posteriori estimation).

In case of capturing multiple datasets of the same target (e.g. multiple ATR images during aiming or lock or track), the resulting time series can be utilized to improve classification performance. This in particularly beneficial in ATR lock/track use-case.

In a further embodiment, the geodetic surveying device is configured to further determine a reflector direction by combining at least the information of
- capturing time,
- angles at capturing time, wherein in case of an array sensor (e.g. camera or line sensor) the position on the sensor (e.g. illuminated pixels) relates to the reflector direction by using imaging optics.

In a further embodiment, based on the classification result and the determined reflector direction, the geodetic surveying device is configured to instruct the motor to stop search and/or aim at, for example,
- every reflector that is a geodetic target,
- every reflector that is a prism (geodetic target subset), and/or
- every reflector that is a reflective tape (geodetic target subset) (i.e. it can distinguish prisms and tapes and use this knowledge in the workflow, as it avoids stopping or aiming at foreign reflectors).

The method carried out with the geodetic surveying device comprises, among other things, the following steps:
- illuminate a reflector with suitable wavelength,
- capture reflector return signal and perform classification on return signal characteristics to distinguish desired reflectors (e.g. surveying prisms, reflective tapes, etc.) from foreign reflectors (e.g. windows, traffic signs, safety vest reflectors, etc.),
- utilize machine learning model to improve performance with new data (e.g. retraining/adaptation of models to new data).

The disclosure is used, among other things, to improve geodetic workflows such as
- automatically aiming at reflective geodetic targets and ignoring undesired reflectors (that may be in the field-of-view of the ATR unit) during aiming (e.g. "spiral search"),
- automatically searching and aiming in bad weather (rain, fog),
- automatically searching and aiming on reflective tapes (not possible for prior art because of weak target signal/spot), and/or
- automatically setting (or suggesting to the user) the prism constant based on the reflector class (the prism constant indicates the EDM addition constant required for correct distance measurement; in prior art the user is required to manually set this constant which is a typical source of error).

In other words, a possible workflow can also be described as follows:
- user or geodetic device triggers automated reflector search,
- the geodetic device then begins automated reflector search with the automated aiming unit (ATR-automated target recognition) by detecting signal returns brighter than background, typically during motion of telescope (in azimuth and/or elevation),
- analyses (classifies) detected reflectors and only stops and aims at desired reflectors which are geodetic targets while ignoring foreign reflectors that are not geodetic targets,
- after aiming at a geodetic target, a measurement can be executed to obtain the target's coordinates,
- performing an EDM measurement or taking an RGB image may further increase the classification confidence.

In other words, a possible workflow can also be described as follows:
- the telescope is coarsely aimed at a reflector,
- the telescope execute a search motion (e.g. spiral search) during which the ATR images are used for classification,
- the telescope is following a moving target by using the ATR sensor,
- during lock, the ATR data are used for classification,
- EDM is utilized to repeatedly measure the target distance, EDM data are utilized to support classification.

Using a defocused ATR (i.e. focused to infinity), targets will feature a blurry spot (in particular visible at ranges below 50 m). If a focused ATR is used (autofocus), computer-vision methods are possible (similar to RGB-image based target classification methods). The advantage of a focused ATR is that the background can be subtracted and its performance is mostly independent of lighting conditions (ambient light) (in other words: the ATR spot is "sharp" while the background is out of focus and therefore can be easier neglected).

In summary (but not limiting/but not exclusively) the previous embodiments have at least the following features compared to the prior art:

- classify reflectors (captured by ATR unit that radiate light and receive light that is returned by reflectors) in order to distinguish desired reflectors (geodetic targets like prisms or reflective tapes) from undesired reflectors (like windows, traffic signs, safety vests, etc.) by applying the classification model on spots,
- distinguish the desired reflector classes "prism" and "reflective tape",
- distinguish reflector classes, e.g., the prism type (e.g. based on the prism constant).

The present disclosure further relates to a geodetic surveying device, in particular total station, laser tracker, laser scanner or theodolite, wherein the geodetic surveying device is configured for surveying retroreflective cooperative targets, in particular of the type surveying prisms or reflective tapes, the geodetic surveying device comprising a base, a telescope, wherein the telescope is configured for carrying out a distance measurement by means of a laser beam emitted via a beam exit of the telescope, and a support, wherein the support is attached to the base so as to be rotatable about a vertical axis of rotation and the telescope is attached to two opposing leg components of the support so as to be rotatable about a horizontal axis of rotation. The geodetic surveying device further comprises an emitting unit, called PowerSearch-illuminator, in particular with a pulse laser diode, for illuminating retroreflective targets with electromagnetic radiation shaped as an, in particular vertical, emitting fan which can be moved over an, in particular horizontal or vertical, angular range, in particular the emitting fan being rotatable over a full circle, wherein the electromagnetic radiation has a modulation, in particular a pulse modulation, in particular with a pulse rate between 10 and 100 kHz (under certain conditions 20 kHz to 200 kHz repetition rate), a receiving unit, called PowerSearch-sensor (photodiode or photodiode array, SiPM array), with an optoelectronic, in particular spatially resolving, detector for detecting signals reflected from the retroreflective targets, the signals being detected by the detector within a, in particular vertical, fan-shaped detection range, the detection range being movable over an, in particular horizontal or vertical, angular range, in particular rotatable over a full circle, and a timer, in particular for determining the time of flight of signals reflected from the retroreflective targets of a pulse of electromagnetic radiation, wherein the receiving unit is configured to detect the signals related to a respective time marker and/or angle marker and, optionally, to provide the signals in a two-dimensional data structure (digitized ADC signal samples (50 to 100 MSps)), in particular with signal strength over angle, and/or signal strength over distance and/or signal strength over time of flight, a processing unit for determining a rough location, in particular an azimuth angle, of the retroreflective targets based on the signals, and an angle encoder, wherein the angle encoder is configured to determine orientations of the telescope and/or the support and/or the PowerSearch illuminator relative to the base.

The geodetic surveying device is configured to distinguish desired targets from undesired targets, wherein the geodetic surveying device further comprises a classification model, wherein the classification model is configured for classification of the retroreflective targets generating the signals, wherein the retroreflective targets are classified into desired targets and undesired targets, wherein the classification is carried out by applying the classification model on the signals, in particular the two-dimensional data structure.

In a further embodiment, the classification is carried out by applying the classification model on signal characteristics.

In other words, when a TPS is searching or aiming, the goal is to exclude foreign reflectors (e.g. windows, vests, etc.) and find desired reflectors, i.e., geodetic reflectors such as prisms, reflective tapes (typically adhesive, i.e., can be glued to objects) or cateye reflectors (cateyes such as found on bikes feature a coarser mini-prismatic structure that implies a more narrow return lobe and stronger return signal compared to reflective tapes). The automated target search (e.g. PowerSearch) is detecting reflectors. Then, the digitized return signal is analyzed to detect at least one reflector and its direction and perform classification of at least one detected reflector by extracting return signal characteristics of the at least one reflector and applying a suitable classifier (classification model) on the return signal characteristics.

The novel idea is to evaluate additional features of the return signal, such as indications of the geometric shape of the reflector, in order to classify the targets into desired and undesired targets. A correlator with suitable basis function (e.g. wavelets, matched filter, or autocorrelation) may be used to increase detection signal-to-noise ratio.

For example, to increase signal-to-noise ratio correlation with reference pulse or autocorrelation will be performed by a filter bank ("matched filter"). The pulse region of interest is sent to a pulse combiner. The combiner combines neighboring pulses into one target region of interest (one target comprises several laser shot pulses). The target region of interest is fed into a classifier.

This disclosure has the advantage over prior art systems that desired targets such as prisms or reflective tapes can be distinguished from undesired targets without having to interrupt the searching and aiming of targets by means of the distance measuring unit. Furthermore, the classification of the targets runs automatically and the user is not forced to select the targets manually or to start the classification on the device. The user can therefore concentrate fully on other tasks or on moving around, which brings an additional increase in safety. In this way, a easier, more time-efficient and safer classification and subsequent measurement of geodetic targets is possible.

In a further embodiment, the PowerSearch-illuminator is comprised by the telescope.

This embodiment has the advantage that the telescope and also the geodetic survey device can be built compactly.

In a further embodiment, the rotation of the support around the vertical axis of rotation and/or the rotation of the telescope around the horizontal axis of rotation is carried out by means of a motor.

This embodiment has the advantage that the alignment of the telescope and/or the PowerSearch unit to a target does not have to be carried out manually by the user (potential source of error), but is carried out automatically and accurately by the motor.

In a further embodiment, the motor rotates the support and/or the telescope such that distance measurements are carried out with desired targets by the (distance measurement) laser beam emitted via the beam exit of the telescope.

This embodiment has the advantage that as soon as a desired target has been classified, the user does not have to manually align the telescope with the target (potential source of error), but instead this is automatically and accurately performed by the motor.

In a further embodiment, the telescope is moved by the rotation around the horizontal axis of rotation and the rotation of the support around the vertical axis of rotation in such a way that the laser beam performs a spiral movement.

In a further embodiment, based on the signals, in particular on the two-dimensional data structure, a geometric shape of the retroreflective targets is derived, in particular wherein the derivation of the geometric shape of the retroreflective targets is based on the signal strength of main and side reflections.

In other words, in PowerSearch, different signal representations are possible. For example, one reflector comprises several (prismatic) reflectors (e.g. at close range the signal shows a side-reflector and the main reflector). The raw signal comprises ADC samples, wherein a "ID shape" can be obtained by summing up a "2D image" in one direction.

This embodiment has the advantage that different target arrangements can be identified on the basis of the determined geometric shape (e.g. a target often consists of several prisms which can be arranged differently).

In a further embodiment, the classification model comprises a catalogue of signal data, wherein the catalogue of signal data comprises at least one of:
signal strength,
angular range, in particular extension of the signal over the angular range,
shape of the signal,
abstract representations of the signal learned by machine learning techniques such as neural networks (the signal data that is learned by machine learning may feature such abstract representations of the signal that are not obvious to the human observer),
distance information, and
physical size of the retroreflective target.

In other words, the expected return signal pattern can in many cases be described analytically as function of the reflector pattern, laser divergence, distance, etc.

This embodiment has the advantage that the catalogue of signal data comprises a variety of signal data and thus different signal data can be used for the classification, wherein the number of signal data used can be varied depending on the quality or probability of a correct classification. If, for example, it is not sufficient to match the signal shape according to signal data comprised in the catalogue of signal data with the signal shape of the signals, further signal data of the catalogue of signal data, such as signal strength, can be used for the matching.

In a further embodiment, based on the signal data comprised in the catalogue of signal data size of the retroreflective targets is determined.

This embodiment has the advantage that, based on the determined size of the targets, different products can be distinguished within a target type (for example, the target tape of a product line exists in different sizes).

In a further embodiment, the size and/or the reflectivity of the retroreflective targets (horizontal and/or vertical dimension) is determined based on the measured distance to the retroreflective targets, wherein the measured distance is obtained by at least one of:
distance meter (EDM) measurement (time-of-flight, waveform digitizer WFD, time to digital converter TDC, etc.),
time-of-flight measurement (pulse or phase), e.g. used in PowerSearch that emits search pulse, or with ToF camera.

In a further embodiment, based on signal data of the catalogue of signal data, different types of retroreflective cooperative targets, in particular surveying prisms and reflective tapes, are determined by matching the signals, in particular the two-dimensional data structure, with the signal data of the catalogue of signal data.

In other words, reflective tapes feature a return signal pattern that can be distinguished from a prism. Prisms may have "Gaussian-like" return signals, while tapes may have "rectangular-like" return patterns. Foreign reflectors and vests have different patterns.

This embodiment has the advantage that several types of targets can be set up at the same time on a construction site and, based on the classification, the targets of the desired type can be correctly and quickly targeted and measured. In this way, for example, a fast, simple and correct measurement of prism targets on a construction site is possible, even though reflective tapes from a previous measurement process are still attached to certain points on the construction site.

In a further embodiment, the signal data of the catalogue of signal data are determined from the signals by means of a machine learning model, and/or the classification is carried out by the machine learning model.

In a further embodiment, if the determination of the type of retroreflective cooperative target indicates that the retroreflective cooperative target is a survey prism, the prism constant is determined.

This embodiment has the advantage that, based on the determined prism constant, different products can be distinguished within a target type (for example, different prism types are used to manufacture targets).

In a further embodiment, the signal characteristics (or the signal data of the catalogue of signal data) are determined from the signal by extraction, wherein the extraction is at least one of
region of interest cropping,
resampling,
interpolation,
rescaling,
subspace method,
summing up one image dimension (2D to 1D)
discrete Fourier transform,
discrete wavelet transform,
feature extraction (e.g. neural network, principal component analysis, autoencoder).

The signal characteristics indicate among other things:
geometric shape of reflective area,
geometrical arrangement of at least one reflective element (e.g. targets often comprises several prismatic reflectors)
size of reflective area (utilizing distance information),
reflectivity (utilizing distance information).

In a further embodiment, the classification is carried out by at least one of or a combination of the following machine learning methods:
clustering,
feature extraction, neural network,
random forest.

In other words, data may be labelled to, among other things, train a neural network in a machine learning context (MobileNet or InceptionNet or InceptionTime network), wherein various neural networks may be employed for classification task.

In a further embodiment, the machine learning model is trained with data generated by the geodetic surveying device and/or with data provided by an external database, in particular the internet and/or a server and/or a cloud (user-input or user-data (in the cloud) can be used for (re-) training; examples of an external database are a server/cloud where user data from the field is stored and a server/cloud where artificially generated data (simulation data) is stored).

This embodiment has the advantage that the machine learning model can be trained with data from various data sources, wherein the internet in particular is a very easily accessible data source. For example, the training is done in the cloud as the computational performance is better/scalable and then the device downloads the newly trained classifier over the (mobile) internet connection.

For example, a first variant will classify based on "target regions of interest", i.e. consider returns of single targets contained within a single ROI. A more advanced variant will consider the history and surroundings (e.g. neighboring targets and pulses).

In a further embodiment, the classification provides soft information such as
likelihood ratios,
confidence scores,
probabilities,
softmax output,
multinomial logistic regression.

In a further embodiment, the geodetic surveying device is configured to provide a likelihood that a retroreflective target is a desired target, in particular wherein the retroreflective target is classified as a desired target when said likelihood reaches the highest likelihood among all possible target classes.

This embodiment has the advantage that a target is classified as desired even if the likelihood has not yet reached a maximum likelihood (among all target classes) and/or a defined threshold and/or a value of 100%.

In a further embodiment, the geodetic surveying device further comprises a RGB camera, wherein RGB images captured by the RGB camera are further used for the classification of the retroreflective targets into desired targets and undesired targets (e.g. by associating the detected reflector patterns with pixels in a camera image that may contain information about the reflector or by utilizing the scene information (target context, e.g., a surveyor carrying a pole equipped with reflector)).

This embodiment has the advantage that the accuracy of the target classification is increased by using a further detection unit.

In a further embodiment, the geodetic surveying device further comprises a time-of-flight (ToF) camera (the return signal is (demodulated) amplitude information ("gray image")), and/or a distance meter receiver (APD, SiPM) that captures a digital signal vector (single-beam distance meter, laser-scanner receiver).

The classification results of several sensors may be combined in a work-flow to increase the likelihood of correct target detection. In addition to the mentioned sensors, the EDM signal characteristics may also be utilized to improve classification performance.

In case of capturing multiple datasets of the same target (e.g. multiple PowerSearch sweeps), the resulting time series can be utilized to improve classification performance.

In a further embodiment, the geodetic surveying device is configured to further determine a reflector direction by combining at least the information of
capturing time,
angles at capturing time.

In a further embodiment, based on the classification result and the determined reflector direction, the geodetic surveying device is configured to instruct the motor to stop search and/or aim at
every reflector that is a geodetic target,
every reflector that is a prism (geodetic target subset), and/or
every reflector that is a reflective tape (geodetic target subset) (i.e. it can distinguish prisms and tapes and use this knowledge in the workflow, as it avoids stopping or aiming at foreign reflectors).

Thus, a "target scan" may be executed in which the TPS "scans" the surrounding by rotating in azimuth without stopping and recording all reflector directions and the associated classes utilizing the PowerSearch sensor.

The method carried out with the geodetic surveying device comprises, among other things, the following steps:
illuminate a reflector with suitable wavelength,
capture reflector return signal and perform classification on return signal characteristics to distinguish desired reflectors (e.g. surveying prisms, reflective tapes, etc.) from foreign reflectors (e.g. windows, traffic signs, safety vest reflectors, etc.),
utilize machine learning model to improve performance with new data (retrain/adapt machine learning model to improve performance based on new data).

The disclosure is used, among other things, to improve geodetic workflows such as
automatically searching for reflective geodetic targets and ignoring undesired reflectors during search (e.g. "PowerSearch").
automatically searching and aiming in bad weather (rain, fog),
automatically searching and aiming on reflective tapes (not possible for prior art because of weak target signal), and/or
automatically setting (or suggesting to the user) the prism constant based on the reflector class (the prism constant indicates the EDM addition constant required for correct distance measurement; in prior art the user is required to manually set this constant which is a typical source of error).

In other words, a possible workflow can also be described as follows:
user or machine triggers automated reflector search,
the geodetic instrument then begins automated reflector search with the PowerSearch unit by detecting signal returns of particular shapes, typically during motion of telescope (in azimuth and/or elevation),
analyses (classifies) detected reflectors and only stops and aims at desired reflectors which are geodetic targets while ignoring foreign reflectors that are not geodetic targets,
after aiming at a geodetic target, a measurement can be executed to obtain the target's coordinates,
performing an EDM measurement or taking an RGB image may further increase the classification confidence.

In other words, a possible workflow can also be described as follows:
- the telescope is coarsely aimed at a reflector,
- the telescope executes a search motion (e.g. spiral search) during which the PowerSearch signals are used for classification,
- EDM is utilized to repeatedly measure the target distance, EDM data are utilized to support classification.

In summary (but not limiting/but not exclusively) the previous embodiments have at least the following features compared to the prior art:
- classify reflectors (captured by PowerSearch unit that radiate light and receive light that is returned by reflectors) in order to distinguish desired reflectors (geodetic targets like prisms or reflective tapes) from undesired reflectors (like windows, traffic signs, safety vests, etc.) by applying the classification model on signals, in particular two-dimensional data structure,
- distinguish the desired reflector classes "prism" and "reflective tape",
- distinguish reflector classes, e.g., the prism type (e.g. based on the prism constant).

This embodiment has the advantage that, if not enough information is available from only one of the sensors (ATR unit or PowerSearch unit), the sensor data (ATR image data and PowerSearch signal data) and classification model from both sensors (ATR unit and PowerSearch unit) are considered together for classification. In an examplary workflow it would look like this: 1. PowerSearch stops because it is unsure but it records the signal for later use, 2. ATR is used to find the exact vertical position and then the signal measured by the ATR and the signal that the PowerSearch recorded in the 1. Step are used together to classify the target.

The present disclosure further relates to a computer program product comprising a program code stored on a machine-readable carrier for carrying out a method for surveying retroreflective cooperative targets by means of a geodetic surveying device, in particular according to a geodetic surveying device as described above (according to any of the preceding claims), wherein the program is carried out in the processing unit of the geodetic surveying device and comprises at least the following steps:
- detecting signals or spots generated by retroreflective targets,
- applying a classification model for classifying the retroreflective targets generating the signals or spots on the signals or the spots,
- classifying the retroreflective targets into desirable targets and undesirable targets based on the output of the classification model.

In the following some key aspects and adavantages (but not limiting/but not exclusively) s described above are listed:
- reflector data are captured by sensors that radiate light to illuminate the reflector and capture the return signal (taking visual images with cameras does not require active illumination),
- distinguishing geodetic targets from foreign reflectors:
  - prisms from foreign reflectors such as vests or tree-leaves,
  - reflective tapes from return signals of similar strength like traffic signs,
- finding reflective targets under harsh environmental conditions (e.g. rain, fog) that typically feature very weak or distorted return signals,
- finding reflective targets occluded by dirt & dust that typically feature weakened or distorted return signals,
- excluding a large number of foreign reflections (windows, traffic signs, safety vests, etc.) with high confidence,
- reduction of search and aim workflow interruptions by foreign reflectors (surveying tasks become more time efficient), and/or
- workflows such as automated setup and orientation are facilitated by knowing the reflector classes and assigning the detected reflectors to an existing reflector list from a previous setup measurement.

By introducing machine learning model, the disclosure is further (but not limiting/but not exclusively) capable of:
- learning new desired reflectors (geodetic targets) and new undesired reflectors (foreign reflectors) based on new data (measured in facilities, synthetic/computer-generated data from simulation tool, user-collected data), and/or
- searching for or excluding specific geodetic target types depending on the desires of the user (e.g. exclude clear 360° prism signals when the user searches for round prisms, or vice versa).

Thus, the reflector classification is done based on signal characteristics pertaining to the reflector geometry. The classifier is based on neural networks (but not limited to) and trained by machine learning techniques.

Thinkable applications (but not limiting/but not exclusively) that utilizes target directions and classification results to store the data and/or forward the data to other instruments or users (HMI) or cloud database and/or support or perform workflows are:
- automated fast target search,
- automated target aiming,
- automated setup and orientation (matching the detected and classified reflectors with a known database), and/or
- automatic target type suggestion (EDM addition constant).

Further modifications s include:
- detection of reflectors with laser scanning data, i.e., in point clouds or TOF image data, and/or
- a (TPS) video panorama functionality used to extract picture information concurrently to the target classification during search motion (azimuth rotation) (the panoramic image contains additional information to support reflector classification).

BRIEF DESCRIPTION OF THE DRAWINGS

Aspects are illustrated in more detail below, purely by way of example, with reference to working examples shown schematically in the drawing. Identical elements are labelled with the same reference numerals in the figures. The described embodiments are generally not shown true to scale and they are also not to be interpreted as limiting.

DETAILED DESCRIPTION

Figure 1:
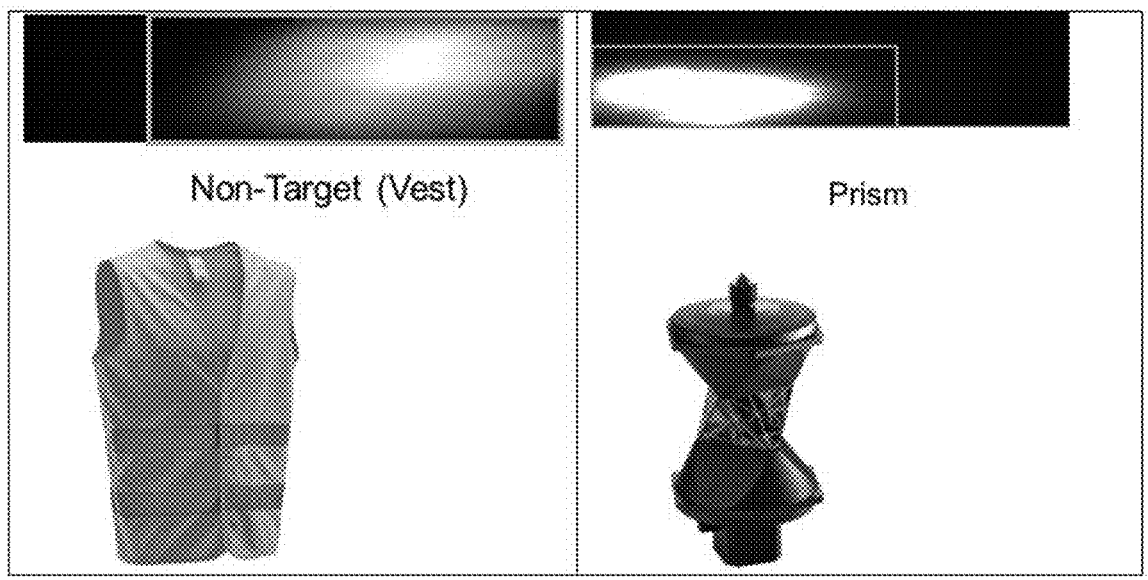
FIG. 1 shows ATR image data of a desired and an undesired target.

FIG. 1 shows ATR image data of a desired (prism) and an undesired (vest) target. It can be seen very clearly how different the spots of the vest and the prism are in the ATR image data. The spot caused by the vest illuminates a large area of the ATR image data, but the intensity of the spot is low. In addition, the transition from spot to unilluminated ATR image data is broad, diffuse and not sharp. The spot caused by a prism, on the other hand, is much smaller, more intense and has a sharp transition from spot to unilluminated ATR image data.

These different spot characteristics, such as size of the spots, shape of the spots, position of the spots in the ATR image data, intensity of the spots or sharpness of the transition from the spots to non-irradiated ATR image data, are recorded as spot data, assigned to the respective targets and collected in a catalogue of spot data. The assignment of the targets can be done, for example, by recording a large number of spot data from different targets (including undesired targets such as windows or warning vests) using geodetic surveying devices and subsequently assigning the ATR image data to the respective targets manually by the user and/or by using a trained neural network. These assigned spot data are then fed into the classification model, which enables a classification of the retroreflective targets into desired targets and undesired targets by applying the classification model on the spots, in particular by matching the recorded spots, in particular spot characteristics, with the catalogue of spot data.

Since the spot characteristics such as intensity, size etc. of the spots in the ATR image data change depending on the distance to the target, it is particularly advantageous if the spot data are included in the catalogue of spot data depending on measured distances to the retroreflective targets, in order to enable an accurate matching.

Figure 2:
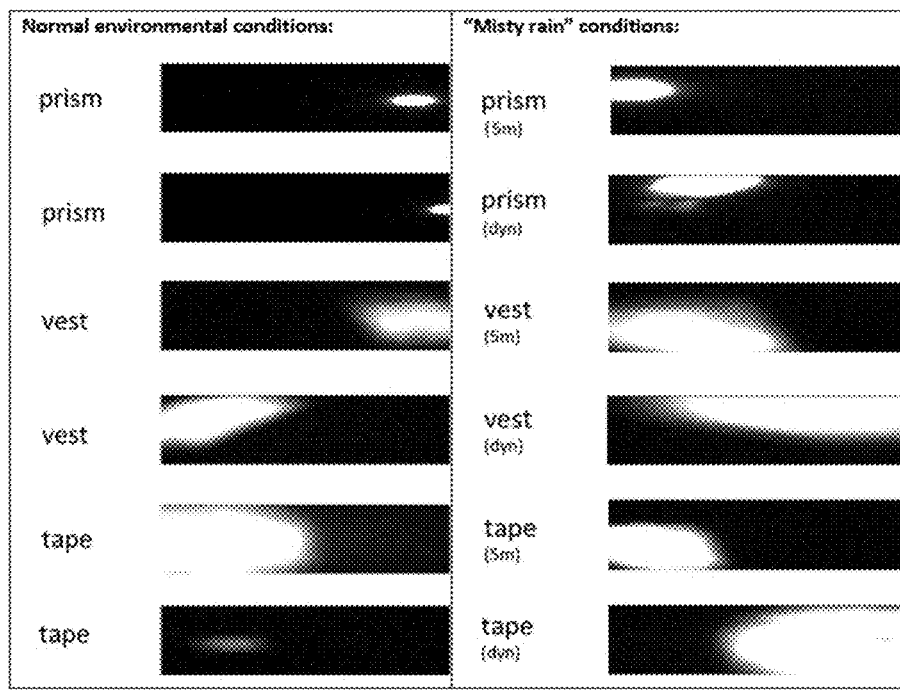
FIG. 2 shows ATR image data relating to different targets recorded during aiming motion and different environmental conditions.

FIG. 2 shows ATR image data relating to different targets recorded during aiming motion and different environmental conditions. The ATR image data in the left column of FIG. 2 show spots of prism, vests and tapes under dry and sufficiently illuminated conditions, with the corresponding upper ATR image data recorded with a non-moving ATR unit and the corresponding lower ATR image data recorded with a moving ATR unit. The same is shown in the ATR image data of the right column of FIG. 2, but under rainy conditions. The comparison of the spots under these different conditions clearly shows that the spots of all different targets are significantly larger, that the intensity of the spots decreases and that the transition of the spots to the non-irradiated area becomes significantly more diffuse under rainy conditions than under "normal conditions". Furthermore, the spots are significantly larger (more elongated) with a moving ATR unit compared to spots with an unmoved ATR unit, which leads, for example, to spots from the west being similar in size to spots from tape targets. Accordingly, a classification based on applying the classification model on the spot, in particular by matching of a spot with the catalogue of spot data, becomes more difficult under unfavourable conditions and/or with a moving ATR unit.

Depending on how well the classification based on the applying of the classification model on a spot is feasible (quality or probability of a correct classification), more or less spot data from the catalogue of spot data can be used for the matching. If it would not be sufficient for a reliable matching of the spots with spot data of the catalogue of spot data to use only the intensity of the spots, for example, the device automatically uses further spot data such as spot size, spot shape, etc. for the matching until the probability of a correct classification reaches a certain value.

Figure 3:
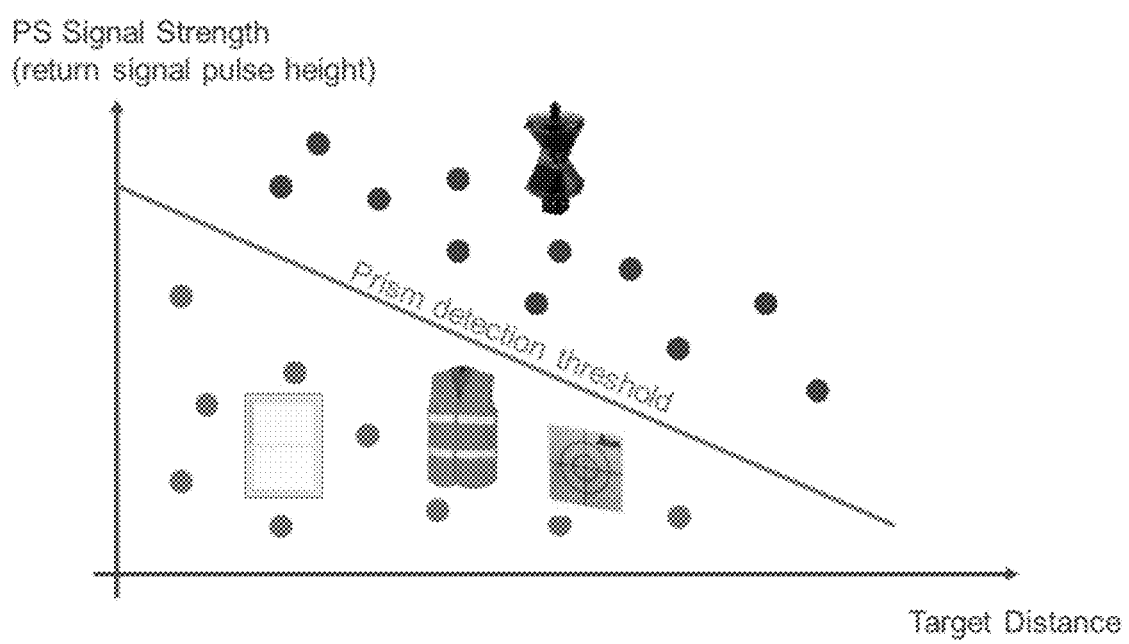
FIG. 3 shows a reflector classification based on PowerSearch data according to prior art.

FIG. 3 shows a reflector classification based on PowerSearch data according to prior art, wherein reflectors are detected based on return signal strength and classified based on a distance-dependent return signal strength threshold. In the shown example, only prisms can be detected because the return signal of reflective tapes is too weak (below threshold or below noise). When prisms are wet or occluded by dirt or dust, the return signal is reduced, and they may be missed (below threshold) respectively miss-classified.

Figure 4:
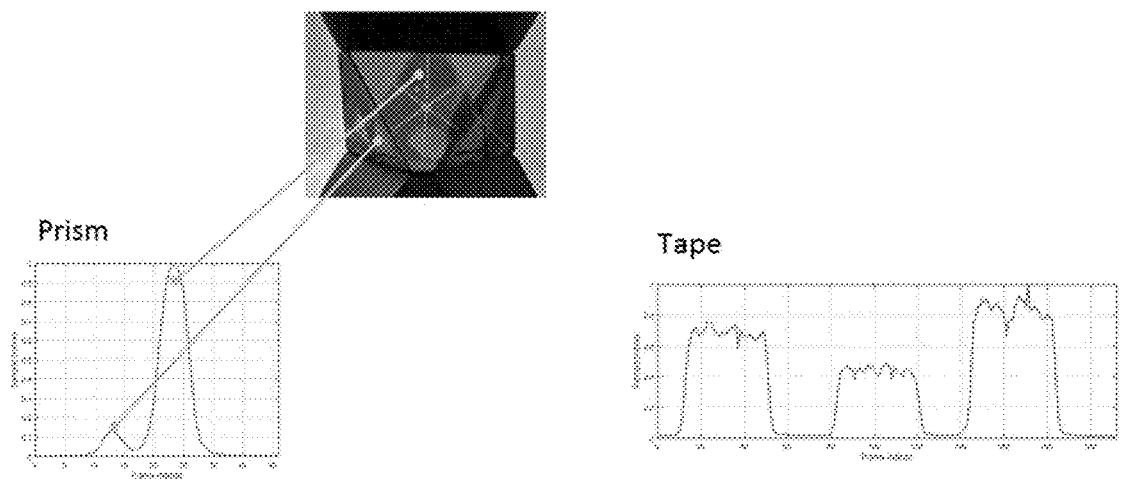
FIG. 4 shows PowerSearch signal data relating to a prism and three tape targets placed next to each other.

FIG. 4 shows PowerSearch signal data relating to a prism and three tape targets placed next to each other. The return signal data of the prism shows a sharp and intense band, which can be clearly assigned to the reflection center of the prism, which is illuminated frontally by the PowerSearch unit. The laterally arranged prism, which is illuminated laterally, also generates a band, which is, however, significantly broader and less intense. In this way, based on the detected PowerSearch return signal, in addition to the assignment as a prism target, a differentiation of the main reflector from a side reflector can also be made.

The return signals of the target tapes are clearly different, since they have broad signals making it difficult to identify a target center. Consequently, prisms and tapes can be very well distinguished from each other based on the respective return signal data.

Figure 5:
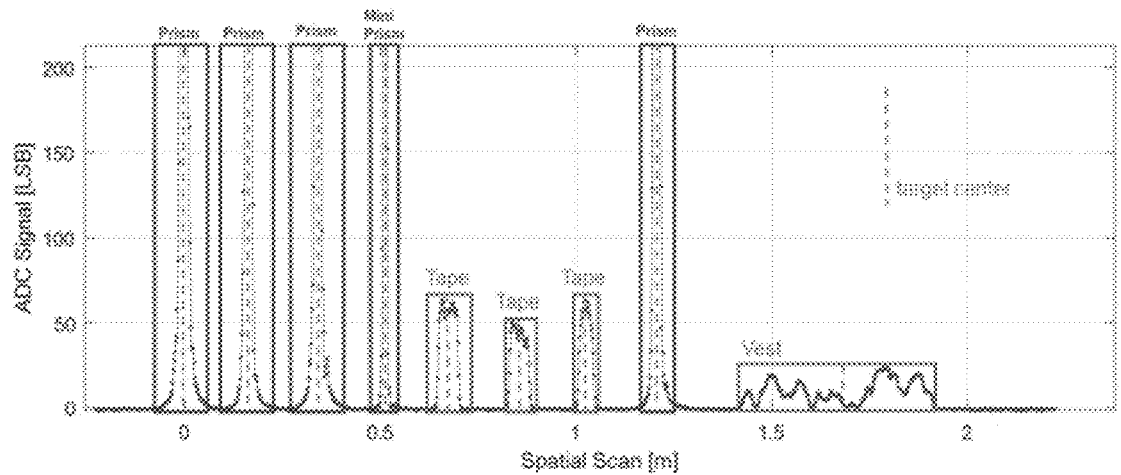
FIG. 5 shows the distinction of different target types based on the PowerSearch signal data.

FIG. 5 shows the distinction of different target types (prisms, tape targets and vests) based on the PowerSearch signal data. It can be seen very clearly how intense and sharp (small extension of the signal over the angular range) the signals of the prisms are compared to the signals of the tapes. The vest, on the other hand, generates a very broad (large extension of the signal over the angular range), noisy and less intense signal.

These different return signal characteristics, such as signal strength, angular range and shape of the signal, are recorded as signal data, assigned to the respective targets and collected in a catalogue of signal data. The assignment of the targets can be done, for example, by recording a large number of signal data from different targets (including undesired targets such as windows or warning vests) using geodetic surveying devices and subsequently assigning the PowerSearch return signal data (e.g. two-dimensional data structure) to the respective targets manually by the user and/or by using a trained neural network. These assigned signal data are then fed into the classification model, which enables a classification of the retroreflective targets into desired targets and undesired targets by applying the classification model on the signals, in particular by matching the recorded signals, in particular the two-dimensional data structure, with the catalogue of signal data.

Since the signal characteristics such as signal strength, shape, etc. of the PowerSearch return signal data change depending on the distance to the target, it is particularly advantageous if the signal data are included in the catalogue of signal data depending on measured distances to the retroreflective targets, in order to enable an accurate matching.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A geodetic surveying device, wherein the geodetic surveying device is configured for surveying retroreflective cooperative targets, the geodetic surveying device comprising:
   a base, a telescope, wherein the telescope is configured for carrying out a distance measurement by means of a laser beam emitted via a beam exit of the telescope, a support, wherein the support is attached to the base so as to be rotatable about a vertical axis of rotation and the telescope is attached to two opposing leg components of the support so as to be rotatable about a horizontal axis of rotation, an emitting unit, called PowerSearch-illuminator, in particular with a pulse laser diode, for illuminating retroreflective targets with electromagnetic radiation shaped as an, in particular vertical, emitting fan which can be moved over an, in particular horizontal or vertical, angular range, in particular the emitting fan being rotatable over a full circle, wherein the electromagnetic radiation has a modulation, in particular a pulse modulation, in particular with a pulse rate between 10 and 100 kHz, a receiving unit, called PowerSearch-sensor, with:
an optoelectronic, in particular spatially resolving, detector for detecting signals reflected from the retroreflective targets, the signals being detected by the detector within a, in particular vertical, fan-shaped detection range, the detection range being movable over an, in particular horizontal or vertical, angular range, in particular rotatable over a full circle,
a timer for determining the time of flight of signals reflected from the retroreflective targets of a pulse of electromagnetic radiation, wherein the receiving unit is configured to detect the signals related to a respective time marker and/or angle marker and, optionally, to provide the signals in a two-dimensional data structure, in particular with signal strength over angle, and/or signal strength over distance and/or signal strength over time of flight, a processing unit for determining a rough location, in particular an azimuth angle, of the retroreflective targets based on the signals, and an angle encoder, wherein the angle encoder is configured to determine orientations of the telescope and/or the support and/or the PowerSearch illuminator relative to the base, wherein the geodetic surveying device is configured to distinguish desired targets from undesired targets, wherein the geodetic surveying device further comprises a classification model, wherein the classification model is configured for classification of retroreflective targets generating the signals, wherein the retroreflective targets are classified into desired targets and undesired targets, wherein the classification is carried out by applying the classification model on the signals, in particular the two-dimensional data structure.

2. The geodetic surveying device according to claim 1, wherein
the PowerSearch-illuminator is comprised by the telescope; and/or
the rotation of the support around the vertical axis of rotation and/or the rotation of the telescope around the horizontal axis of rotation is carried out by means of a motor, in particular wherein the motor rotates the support and/or the telescope such that distance measurements are carried out with desired targets by the laser beam emitted via the beam exit of the telescope.

3. The geodetic surveying device according to claim 1, wherein the classification model comprises a catalogue of signal data, wherein the catalogue of signal data comprises at least one of:
signal strength,
angular range, in particular extension of the signal over the angular range,
signal representative of geometric shape of the retroreflective target,
shape of the signal,
abstract representations of the signal learned by machine learning techniques such as neural networks,
distance information, and
physical size of the retroreflective target; wherein:
based on signal data of the catalogue of signal data, different types of retroreflective cooperative targets, in particular surveying prisms and reflective tapes, are determined by matching the signals with the signal data of the catalogue of signal data; and/or
the signal data of the catalogue of signal data are determined from the signals by means of a machine learning model, and/or
the classification is carried out by the machine learning model.

4. The geodetic surveying device according to claim 3, wherein the machine learning model is trained with data generated by the geodetic surveying device and/or with data provided by an external database, in particular the internet and/or a server and/or a cloud.

5. The geodetic surveying device according to claim 1, wherein the classification is carried out by at least one of or a combination of the following:
clustering,
feature extraction,
neural network,
random forest.

6. The geodetic surveying device according to claim 1, wherein the geodetic surveying device is configured to provide a likelihood that a retroreflective target is a desired target.

7. The geodetic surveying device according to claim 1, wherein the geodetic surveying device further comprises a RGB camera, wherein RGB images captured by the RGB camera are further used for the classification of the retroreflective targets into desired targets and undesired targets.

8. The geodetic surveying device according to claim 1, wherein the retroreflective cooperative targets are of the type surveying prisms or reflective tapes.

9. A computer program product comprising a program code stored on a non-transitory machine-readable medium for carrying out the method for surveying retroreflective cooperative targets by means of the geodetic surveying device according to claim 1, wherein the program is carried out in the processing unit of the geodetic surveying device and comprises at least the following steps:
detecting signals or spots generated by retroreflective targets,
applying a classification model for classifying the retroreflective targets generating the signals or spots on the signals or the spots,
classifying the retroreflective targets into desirable targets and undesirable targets based on the output of the classification model.

* * * * *